J. L. G. DYKES.
TIRE BAND STRETCHING AND VULCANIZING MACHINE.
APPLICATION FILED NOV. 28, 1917.

1,370,102. Patented Mar. 1, 1921.
4 SHEETS—SHEET 1.

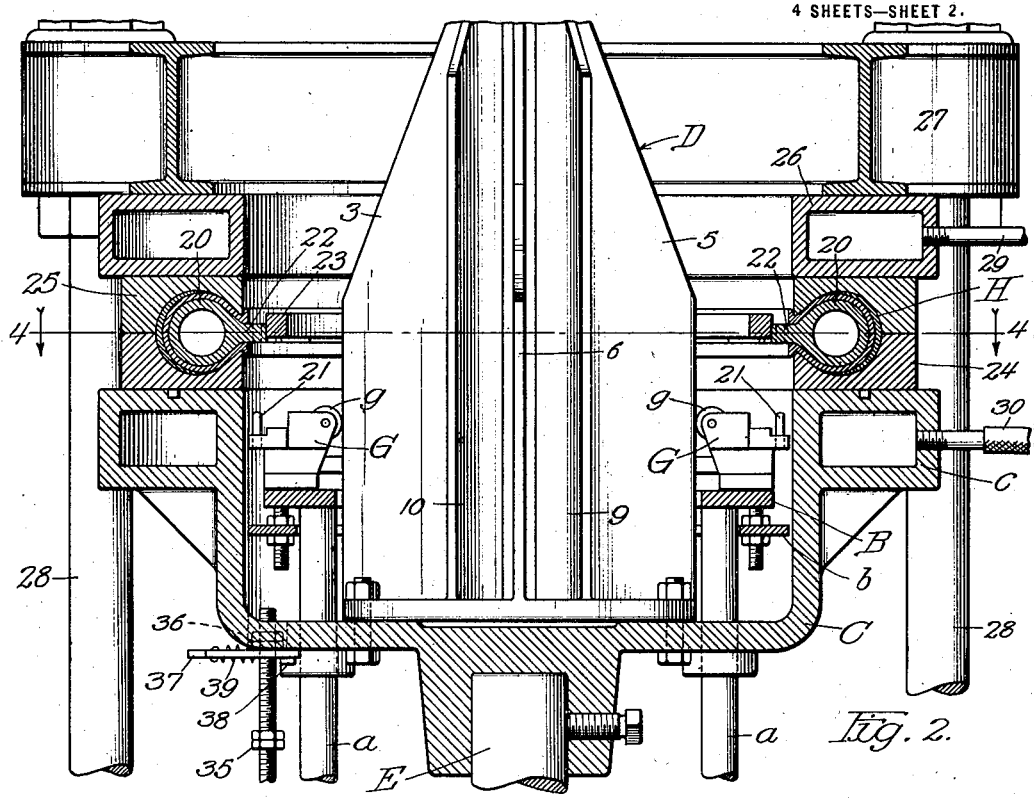
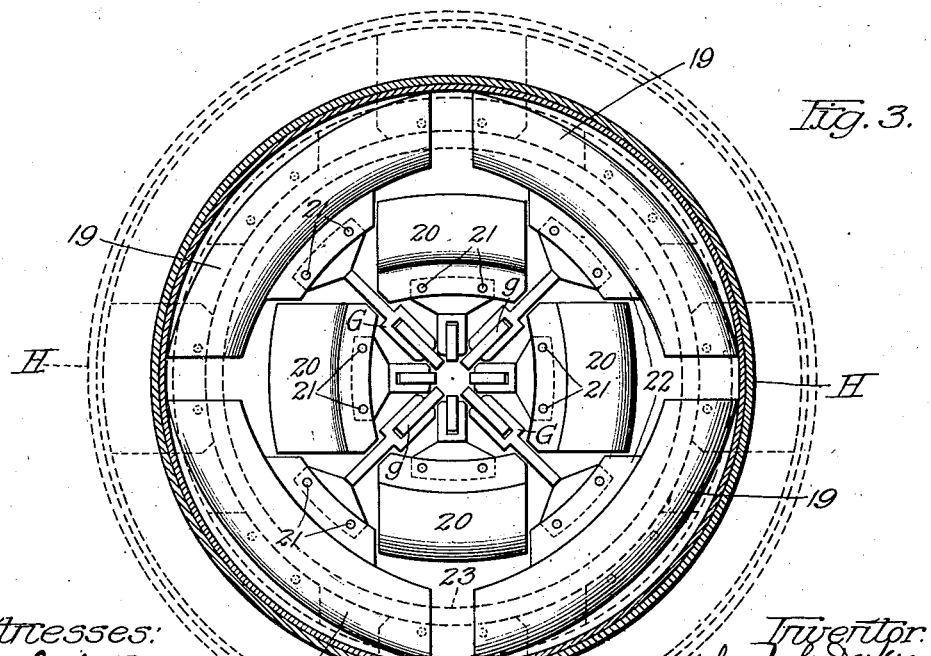

J. L. G. DYKES.
TIRE BAND STRETCHING AND VULCANIZING MACHINE.
APPLICATION FILED NOV. 28, 1917.
1,370,102.
Patented Mar. 1, 1921.
4 SHEETS—SHEET 4.
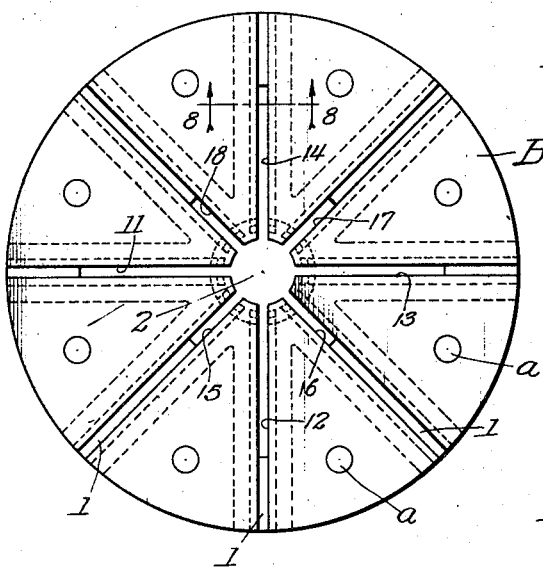
*Fig. 6.*
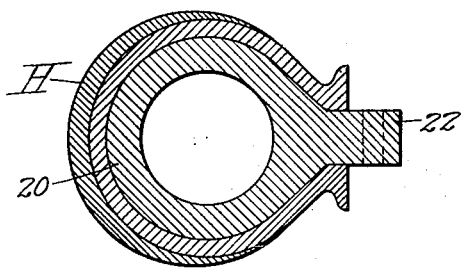
*Fig. 7.*
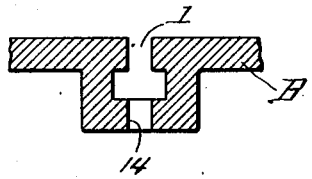
*Fig. 8.*
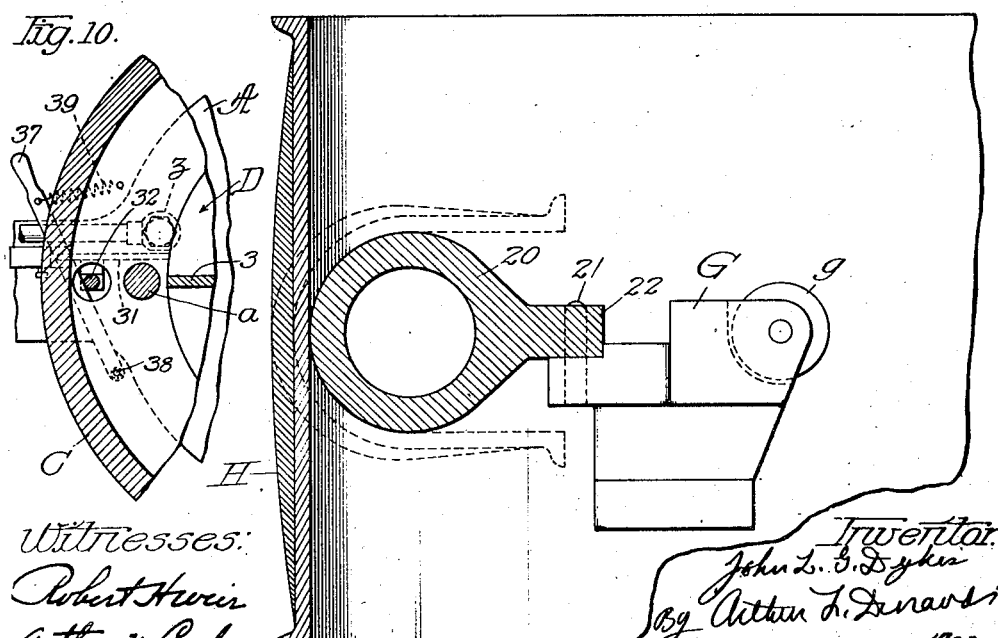
*Fig. 9.*
*Fig. 10.*
Witnesses:
Robert Hewis
Arthur W. Carken
Inventor
John L. G. Dykes
By Arthur L. Denardi
Atty.

UNITED STATES PATENT OFFICE.

JOHN L. G. DYKES, OF CHICAGO, ILLINOIS, ASSIGNOR TO ERNEST HOPKINSON, OF NEW YORK, N. Y.

TIRE-BAND STRETCHING AND VULCANIZING MACHINE.

1,370,102.  Specification of Letters Patent.  Patented Mar. 1, 1921.

Application filed November 28, 1917. Serial No. 204,371.

*To all whom it may concern:*

Be it known that I, JOHN L. G. DYKES, a citizen of the United States of America, and resident of Chicago, county of Cook, and State of Illinois, have invented a certain new and useful Improvement in Tire-Band Stretching and Vulcanizing Machines, of which the following is a specification.

My invention contemplates a novel machine for use in converting annular bands of fabric and rubber into pneumatic casings or sheets, and involves certain of the principles of the process covered by my prior application Serial No. 184,197, filed August 3, 1917, and involved in the machine covered by my application Serial No. 193,977, filed September 29, 1917, to which applications this present application is subordinate.

Generally stated, the object of the invention shown and described herein is to provide a novel construction and arrangement involving means for automatically transferring the annular band of fabric and rubber, after it is stretched on a sectional mandrel, to the vulcanizing machine or press by which the pneumatic tire casing is then either partially or fully vulcanized; to provide a novel form of mechanism for expanding the sectional mandrel on which the annular bands of fabric and rubber are stretched to the diameter and approximately the shape desired for the pneumatic tire casing; and to provide a novel and effective arrangement for automatically controlling the fluid pressure by which the machine is operated.

It is also an object to provide certain details and features of construction and combinations tending to increase the general efficiency and desirability of a tire-band-stretching machine of this particular construction, and tending to solve many of the problems involved in the manufacture of pneumatic tire casings by this particular method.

To these and other useful ends, the invention consists in matters hereinafter set forth and claimed.

In the accompanying drawings:—

Fig. 2 is a view similar to Fig. 1, on a larger scale, but with the lower portion of the machine broken away for convenience of illustration, and with the parts shown in the positions which they assume during the vulcanizing operation.

Fig. 3 is a plan of the sectional mandrel, on the same scale as Fig. 2, showing the sections of the mandrel contracted, so that the mandrel and the mechanism for the operation thereof are in the condition shown in Fig. 1, being ready to engage the band of fabric and rubber for the stretching thereof.

Fig. 6 is a top plan view of the table shown in Fig. 5.

Fig. 7 is an enlarged cross-section of the mandrel, showing a tire-casing thereon in compressed or vulcanized condition—that is to say, showing the tire-casing conformed to the cross-sectional contour of the mandrel.

Fig. 8 is an enlarged detail section on line 8—8 in Fig. 6.

Fig. 9 is an enlarged sectional view, on the same scale as Fig. 7, showing the band of fabric and rubber before being stretched, and illustrating in dotted lines the condition of the said band after the expansion of the mandrel, and before the vulcanizing operation.

Fig. 10 is an enlarged detail section on line 10—10 in Fig. 1.

Figure 1:
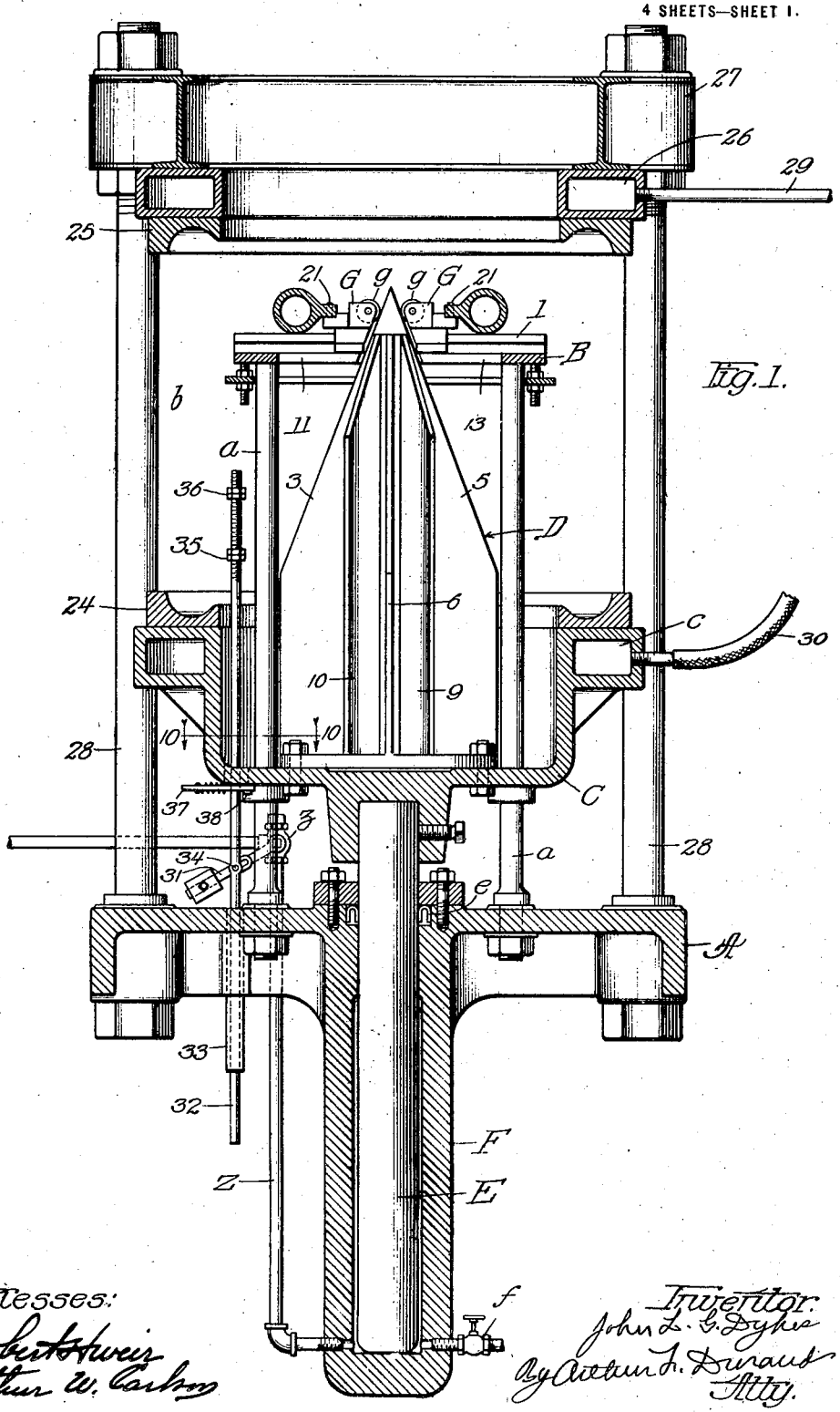
Figure 1 is a vertical central section of a tire-band-stretching and vulcanizing machine embodying the principles of the invention, showing the machine with the parts thereof in condition to receive a band of fabric and rubber.
Figure 4:
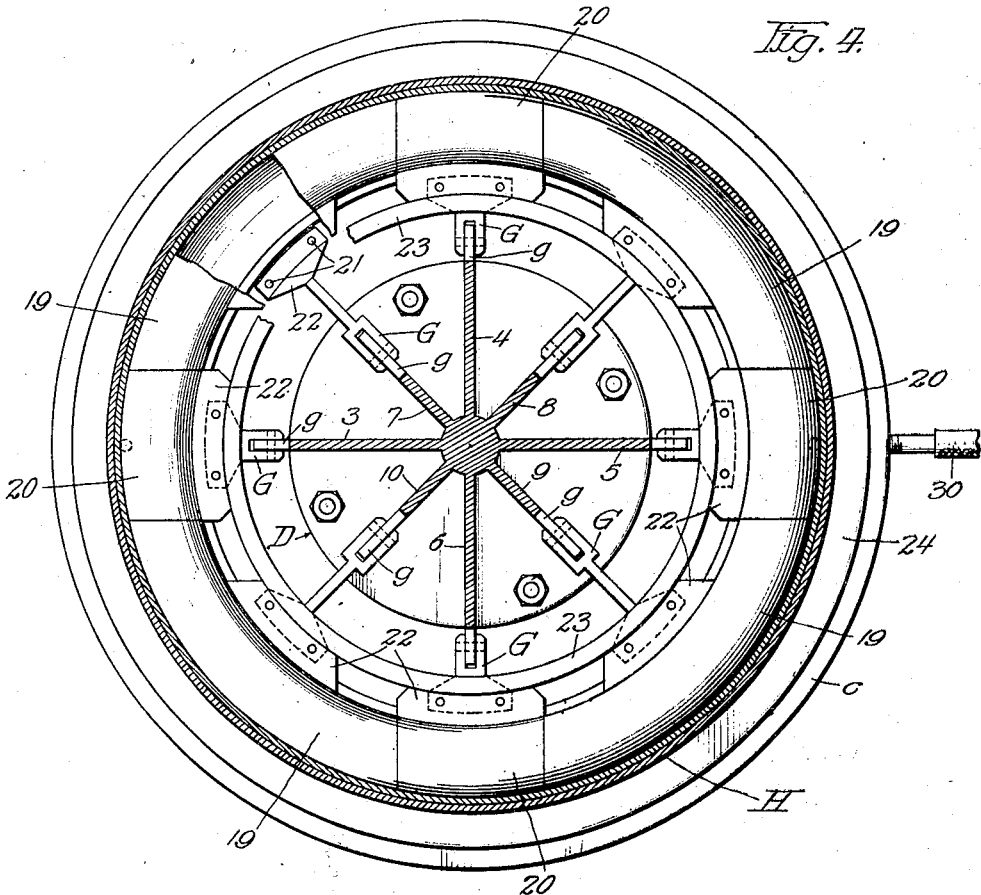
Fig. 4 is a horizontal section on line 4—4 in Fig. 2.
Figure 5:
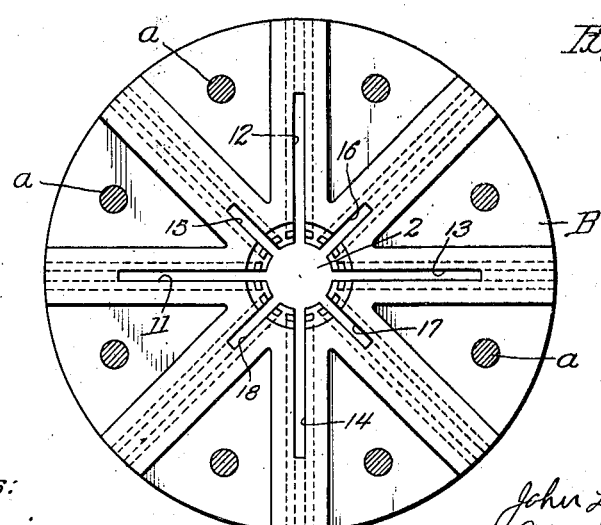
Fig. 5 is a bottom plan view of the stationary table upon which certain elements of the expanding mechanism are mounted for operation.

As thus illustrated, my invention comprises a stationary frame or body A provided with vertically disposed rods or standards *a* upon the upper ends of which is mounted the disk-like table B, the latter having radial guides 1 formed in the upper surface thereof, and having a central opening 2 from which said guides radiate. The vertically reciprocating head C carries the cam-member D, which latter is made up of vertically disposed and radially arranged cam-plates 3, 4, 5 and 6, which are relatively long, or which extend some distance from the center of said member, and the relatively short cam-plates 7, 8, 9 and 10, the long plates alternating with the short plates, (see Fig. 4) and these plates being disposed in position to move up and down in the relatively long and short slots 11, 12, 13 and 14 and 15, 16, 17 and 18 formed in the table. It will be seen that these slots communicate with the guides 1 formed in the top of said table. A plunger E has its upper end secured to the bottom of the vertically reciprocating head C and operates vertically in a guide or stuffing-box $e$, of suitable character, provided in the top of the body A, and is inclosed by the cylinder F, which latter receives the fluid under pressure to force the plunger upward. The sliding carriers G operate in the guides 1, and are each provided with a roller $g$ to engage the outer edge of one of the cam-plates, (see Figs. 1, 2 and 4) whereby the carriers are pushed outward when the member D rises. Relatively long mandrel sections 19 are suitably secured to four of said carriers G, so that every other carrier has a relatively long mandrel section; and relatively short mandrel sections 20 are secured to the other or intermediate carriers, whereby these carriers each have a relatively short mandrel section adapted for insertion between the relatively long mandrel sections.

It will be seen that the carriers G which have the mandrel sections 19 are operated by the relatively short cam-plates 7, 8, 9 and 10, while the carriers which have the relatively short mandrel sections 20 are operated by the relatively long cam-plates 3, 4, 5 and 6, whereby the short sections of the mandrel have a much greater movement toward and away from the center which forms the axis of the radial movements thus given the sections of the mandrel. In this way, when the member D is raised, the beveled upper edges of the cam-plates 7, 8, 9 and 10 first engage the rollers $g$ of their respective carriers G, so that the relatively long sections 19 of the mandrel are moved ahead to their outer positions. Thereafter, in proper time, the beveled or inclined upper edges of the cam-plates 3, 4, 5 and 6, by engagement with the rollers of their respective carriers G, force the relatively short sections 20 of the mandrel between the long sections so that the mandrel, which is a stretcher, assumes its ring-like or annular form, and thus stretches the band in the desired manner. As shown, the inclined or beveled upper edges of the plates 3, 4, 5 and 6 are much longer than the beveled or inclined upper edges of the plates 7, 8, 9 and 10, so that while the sections 19 and 20 all start moving outward together, at about the same speed, nevertheless it is true that the sections 19 stop moving outward when the rollers of their carriers are reached by the vertical edges of the plates 7, 8, 9 and 10, whereas the sections 20 continue to move outward until they assume the positions necessary for completing the continuity of the mandrel. The band H of fabric and rubber, which it will be understood, is preferably in the form of an annular flat band, is supported at its lower edge on the shelf or ring $b$, immediately below the outer edge of the table B, so that the band is in position to be properly engaged by the outwardly moving sections of the mandrel, (see Fig. 9) and thereby to stretch the tread portion of the band to the full diameter desired for the tire-casing, but causing the edges or rim portions of the band to remain substantially in unstretched condition. In this way, the band is partially conformed to the mandrel or stretcher, and must thereafter be compressed or vulcanized to cause the condition shown in Fig. 7, which is substantially or approximately the cross-sectional shape desired for the tire-casing. For this purpose, therefore, the sliding carriers G are provided with vertically disposed dowel pins 21, and the mandrel sections are provided with inner flanges 22 having openings to receive these dowel pins, whereby each mandrel section is removable upwardly from the expanding mechanism. In this way, the mandrel, with the stretched band thereon, can be removed from the machine and placed in a vulcanizing press. In order that the sections of the mandrel may be securely held in place, while under the strain or tension of the stretched band thereon, after being removed from the stretching machine, a ring 23 (see Fig. 2) is placed inside of the mandrel, with its outer edge against the inner edge of the flanges 22, this being done before the mandrel is lifted from its separable connection with the expanding mechanism. Said ring 23 then holds the mandrel in expanded condition.

As a matter of further and special improvement, the machine shown and described involves instrumentalities for effecting the vulcanization of the stretched tire-casing on the mandrel or stretcher, which are as follows:—The head C preferably carries, on its hollow portion $c$, the lower member 24 of a vulcanizing mold, in position to engage the under-side of the band which has been stretched on the mandrel. When the head C moves upward, the mold member 24 arrives in operative position just after the stretching operation, and at the proper time to lift the mandrel and the stretched band from the carriers G, so that the mandrel and tire-casing thereon are then carried upward against the upper mold member 25, which latter is supported by the hollow ring 26, rigidly mounted on the frame 27 carried by the uprights 28, the latter being suitably mounted at their lower ends on the body A of the machine. A steam pipe 29 leads to the hollow ring 26, and a similar steam pipe 30 leads to the hollow ring-like portion $c$ of the reciprocating head, whereby the two halves or members of the mold are heated to the temperature necessary for vulcanizing the rubber of the tire-casing.

After the vulcanizing of the tire-casing, in this manner, the ring 23 is then removed, and the sections of the mandrel are removed from the interior of the tire-casing. The head C is then moved downward to its lower position. The sections of the mandrel can then be placed on the dowel pins 21, and another band can then be stretched. On the other hand, if it is desired to merely give the tire casing a preliminary compression or vulcanizing treatment, the mandrel and tire-casing can be allowed to remain in place, when the head C moves downward, and can then be removed intact from the machine, with the ring 23 therein. The mandrel and ring, and the partially compressed or vulcanized tire-casing thereon, can then be placed in another vulcanizing press or may be subjected to other treatment. In any event, though, the present invention affords opportunity for a preliminary compression of the tire-casing, and for at least some vulcanization, in the same machine in which the band is stretched on the sectional mandrel, and, with the construction shown and described, one half or member of the mold is employed for automatically lifting the mandrel and stretched band thereon out of engagement with the expanding mechanism, so that the mandrel and tire-casing can then be immediately removed and placed in another machine, or subjected to other treatment; but, if desired, the mandrel and tire-casing thus lifted out of engagement by the expanding mechanism can then be carried upward into engagement with the other half or member of the mold, in the manner explained.

Fluid under pressure, of suitable character, is admitted to the cylinder F through a pipe Z having a valve $z$ operated by a weighted arm 31 (see Figs. 1 and 10), whereby when this arm is down the valve is open, but when the arm is up the valve is closed. A vertically reciprocating rod 32, mounted to move up and down in a vertical guide 33 on the body of the machine, has a suitable pivotal connection 34 with said arm 31 and extends upward through the head C, being provided with spaced shoulders 35 and 36 on its upper end portion. A hand-lever 37 is pivoted at 38 on the under-side of the reciprocating head C, and is provided with a spring 39 to hold it normally against the side of said rod 32, so that when the head C moves upward this hand-lever strikes the shoulder 35 and moves the rod upward. This raises the arm 31, causing the valve $z$ to close, whereby the admission of pressure to the cylinder F is discontinued. This shutting off of the pressure occurs, it will be seen, immediately after the sectional mandrel is fully expanded, so that the operation of the machine automatically ceases as soon as the stretching operation is completed, at which time the mold member 24 is just below the mandrel with the stretched band thereon. The operator or attendant then pulls the lever 37 outward, allowing the rod 32 to go downward by gravity, thus opening the valve $z$, so that the pressure will continue to enter the cylinder and thereby again move the head C upward. The parts are so relatively proportioned that when the operator or attendant releases the lever 37 the latter will then again engage the rod immediately some distance below the shoulder 36, but above the shoulder 35, whereby when the head C continues to move upward this lever 37 will finally engage the shoulder 36, causing the rod 32 to again move upward. In this way, by the second upward movement of the rod 32, the valve $z$ is again closed, and this occurs as soon as the mold member 24 has moved upward far enough to compress the tire casing between the two halves of the mold. The upward movement of the head C having been automatically stopped as soon as the tire-casing is fully compressed in the mold, the parts will then remain in the condition shown in Fig. 2 until the pressure is released from the cylinder F, for which purpose an outlet $f$ may be provided at the bottom of the cylinder. Any suitable provision can be employed for keeping the valve $z$ closed while the machine is being made ready for another operation. For example, the operator can hold the arm 31 in its raised position, or can insert an object under this arm for that purpose, the only requirement being that the valve $z$ be maintained closed until it is again desired to have the head C move upward. Of course, if the outlet $f$ is open, the condition of the valve $z$ is unimportant, as the pressure entering will immediately leave the cylinder without forcing the plunger upward, and when everything is ready the valved outlet $f$ can then be closed to immediately start the head C upward, which movement will continue until the hand-lever 37 strikes the shoulder 35, and will then be resumed until the hand-lever afterward strikes the shoulder 36, whereby the head C will move upward in two stages, being automatically stopped at the end of each upward movement, in the manner explained.

It will be understood, of course, that a plurality of mandrels can be used interchangeably in said machine, if it is desired to use one mandrel for stretching another band while the previous band is in use in another machine for vulcanizing purposes. In such case, the expanded mandrel with the stretched band is moved from the machine, and placed in the vulcanizing machine, or subjected to other treatment; but during this time, another mandrel is placed in engagement with the expanding mechanism, and another band is stretched.

From the foregoing, it will be seen that the disconnection of the expanded mandrel, with the stretched band thereon, from the operating mechanism, is automatically and immediately followed by a compression to shape the band on the disconnected mandrel. It is because of the total disconnection of the mandrel from the operating mechanism that the ring 23, or any other suitable means for this purpose, is employed to retain the mandrel in expanded condition against the constant tendency of the band to contract after being stretched. Each mandrel section is independent of the others, having movement radially and bodily away from the center or axis of the mandrel, and each section having its own independent connection with the operating mechanism, in the manner shown and described, whereby the stretching of the band is rendered uniform in character, there being no rotation of the band and mandrel relative to each other, during the stretching operation, each section of the mandrel simply pushing straight ahead without sliding movement circumferentially of the band or tire casing.

The disconnection of the mandrel from the operating mechanism, with the stretched band thereon, is not only automatically followed by compression of the band of fabric and rubber on the mandrel, but also by vulcanization, inasmuch as steam pipes 29 and 30 lead to the chambers 26 and c in the two jaws of the vulcanizing press. The lower jaw of the press constitutes the means for lifting and disconnecting the mandrel from the operating mechanism, and inasmuch as the upward movement continues without interruption and without any necessity of further manual control, the upper jaw then constitutes the means whereby the disengagement of the mandrel or stretcher from the operating mechanism is automatically followed by compression and molding to give the band permanent tire shape.

What I claim as my invention is:

1. The combination of a sectional mandrel, means to support a tire-band in position for stretching, with the tread portion of the band immediately outside of said mandrel, operating mechanism to expand the mandrel and thereby stretch and increase the diameter of said tread portion of the band, so that the rim portions of the band will fold toward each other upon the mandrel, the sections of said mandrel being detachably connected with said mechanism, devices to lift the mandrel in expanded condition and with the stretched band thereon out of engagement with said mechanism, and instrumentalities coöperating with said devices to compress the band on the disconnected mandrel.

2. The combination of a sectional mandrel for stretching a tire-band, operating mechanism, means to detachably connect the sections of said mandrel with said mechanism, so that said mandrel in expanded condition and with the stretched band thereon is removable from said mechanism, instrumentalities to automatically lift said mandrel out of engagement with said mechanism, and means coöperating with said instrumentalities to compress the band on the mandrel.

3. A structure as specified in claim 1, and means to automatically interrupt the operation of said mechanism after the band is stretched on the mandrel, having provisions whereby the mandrel with the stretched band thereon is thereafter moved upward and automatically brought to rest in the position necessary for the compression of the band on the mandrel.

4. A structure as specified in claim 2, and means to automatically stop the operation of said mechanism, and to automatically stop the operation of the machine when the required degree of compression of the band on the mandrel is reached.

5. The combination of a sectional mandrel for stretching a tire-band, operating mechanism, means to detachably connect the sections of said mandrel with said mechanism, so that said mandrel in expanded condition and with the stretched band thereon is removable from said mechanism, said mechanism comprising slides to which the sections of the mandrel are detachably connected, so that each section is operated independently of the others, and means which are movable upwardly to force said slides outward to expand the mandrel.

6. The combination of a sectional mandrel, means to support a tire-band in position for stretching, with the tread portion of the band immediately outside of said mandrel, operating mechanism to expand the mandrel and thereby stretch and increase the diameter of said tread portion of the band, so that the rim portions of the band will fold toward each other upon the mandrel, the sections of said mandrel being detachably connected with said mechanism, devices to lift the mandrel in expanded condition and with the stretched band thereon out of engagement with said mechanism, said mechanism comprising means movable upwardly to expand the mandrel, having provisions whereby continuation of such upward movement beyond a certain point is inoperative to further expand the mandrel.

7. The combination of a sectional mandrel for stretching a tire-band, operating mechanism, means to detachably connect the sections of said mandrel with said mechanism, so that said mandrel in expanded condition and with the stretched band thereon is removable from said mechanism, instrumentalities to automatically lift the mandrel and the stretched band thereon out of operative relation to said mechanism, and means coöperating with said instrumentalities to vulcanize the band on the mandrel.

8. The combination of a sectional mandrel, means to support a tire-band in position for stretching, with the tread portion of the band immediately outside of said mandrel, operating mechanism to expand the mandrel and thereby stretch and increase the diameter of said tread portion of the band, so that the rim portions of the band will fold toward each other upon the mandrel, said mandrel being detachably connected with said mechanism, means to lift the mandrel in expanded condition and the stretched band thereon out of engagement with said mechanism, and means whereby the disconnection of the mandrel from the operating mechanism is automatically followed by compression and molding to shape the band on the disconnected mandrel.

9. The combination of a sectional mandrel for stretching a tire-band, operating mechanism, means to detachably connect said mandrel with said mechanism, so that said mandrel in expanded condition and with the stretched band thereon is removable from said mechanism, and means whereby the disconnection of the mandrel from the operating mechanism is automatically followed by compression and molding to shape the band on the disconnected mandrel.

10. The combination of a sectional mandrel for stretching tire-bands into shape for vulcanizing, and for use after each stretching operation in the vulcanizing of the stretched band thereon, mechanism to operate said mandrel, means to detachably connect the mandrel with said mechanism, so that the mandrel while in expanded condition and with the stretched band thereon is removable from said mechanism after the stretching operation, means to control the operation of said mechanism, said mandrel being annular and comprising segmental sections which are separable after the mandrel is disconnected from said mechanism, and means whereby the disconnection of the mandrel from the operating mechanism is automatically followed by compression and molding to shape the band on the disconnected mandrel.

11. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon so that a plurality of mandrels can be used interchangeably in said machine, means to retain the mandrel in expanded condition when removed from the machine, a device to lift the mandrel from the machine, and means whereby the disconnection of the mandrel from the operating mechanism is automatically followed by compression and molding to shape the band on the disconnected mandrel.

12. In a machine for stretching bands of fabric and rubber into shape for pneumatic tires, the combination of a sectional mandrel to receive the band, mechanism to operate the sections of said mandrel to stretch the band thereon, having provisions whereby said mandrel is separable from said mechanism, thereby to permit removal of the mandrel with the stretched band thereon, so that a plurality of mandrels can be used interchangeably in said machine, means to retain the mandrel in expanded condition when removed from the machine, the alternate mandrel-sections being beveled inside at their ends, the intermediate mandrel-sections having their ends beveled outside to wedge tightly between said alternate mandrel-sections when the mandrel is expanded, said retaining-means comprising a ring adapted to fit within the mandrel, and means whereby the disconnection of the mandrel from the operating mechanism is automatically followed by compression and molding to shape the band on the disconnected mandrel.

13. In a tire-band stretching and vulcanizing machine, the combination of a stretcher to expand the band, mechanism to operate said stretcher, and power operated means to disengage the stretcher with the stretched band thereon from said mechanism.

14. A structure as specified in claim 13, in combination with means to maintain the stretcher in expanded condition against the tendency of the band to contract, and means whereby the disengagement of the stretcher from said mechanism is automatically followed by compression and molding to give the band tire shape.

15. A structure as specified in claim 13, and means whereby the disengagement of the structure from said mechanism is automatically followed by compression in a vulcanizing press to give the band permanent tire form.

16. A structure as specified in claim 8, and means whereby said compression is accompanied by vulcanization.

17. In a tire making machine, a mandrel adapted for stretching a flat band to the maximum diameter desired for the tire, a press for receiving the mandrel with a stretched band thereon, so that the stretching means carry the band in fully stretched condition to the press, and means for operating the press to conform the band to the mandrel.

18. The combination of a vulcanizing mold, a sectional mandrel for stretching a band to form a tire casing, mechanism to operate the mandrel to fully stretch the band thereon to maximum diameter, means whereby the mandrel is detachable from said mechanism, means to prevent the sectional mandrel from collapsing under the strain of the stretched band thereon when the sections of the mandrel are detached from said mechanism, and means to deliver the mandrel and stretched band to said mold.

19. A structure as specified in claim 18, said mandrel-delivering means comprising a mold which coöperates with said first mentioned mold to form and vulcanize the tire casing.

20. A structure as specified in claim 18, said mandrel-delivering means serving to move the mandrel and stretched band bodily in the direction of the axis thereof.

Signed by me at Chicago, Cook county, Illinois, this fifth day of November, 1917.

JOHN L. G. DYKES.